March 4, 1952  A. MUSSCHOOT ET AL  2,588,030
FEEDER FOR OSCILLATING CONVEYERS
Filed Dec. 8, 1948  2 SHEETS—SHEET 1
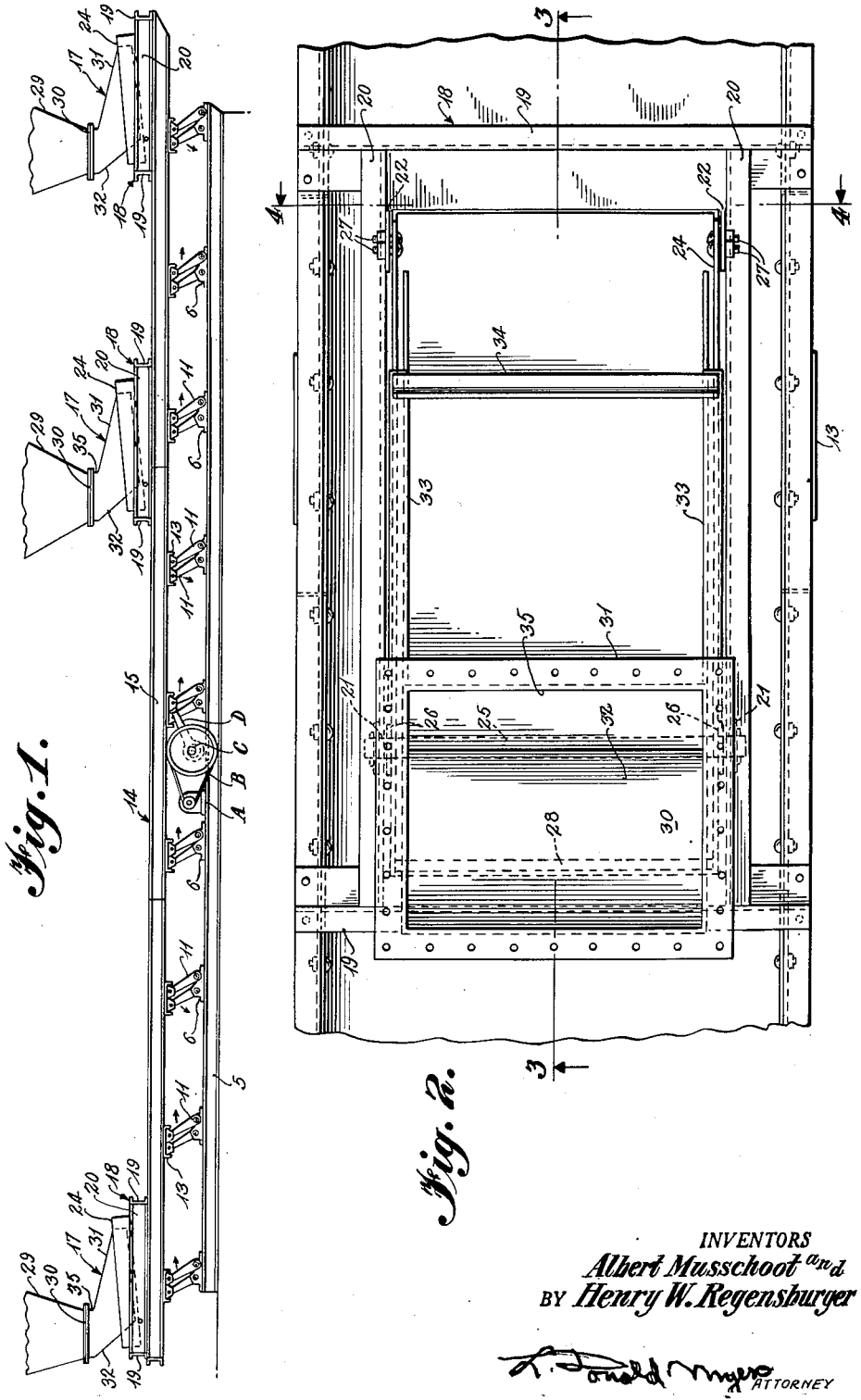
INVENTORS
Albert Musschoot and
BY Henry W. Regensburger
ATTORNEY March 4, 1952     A. MUSSCHOOT ET AL     2,588,030
FEEDER FOR OSCILLATING CONVEYERS
Filed Dec. 8, 1948     2 SHEETS—SHEET 2
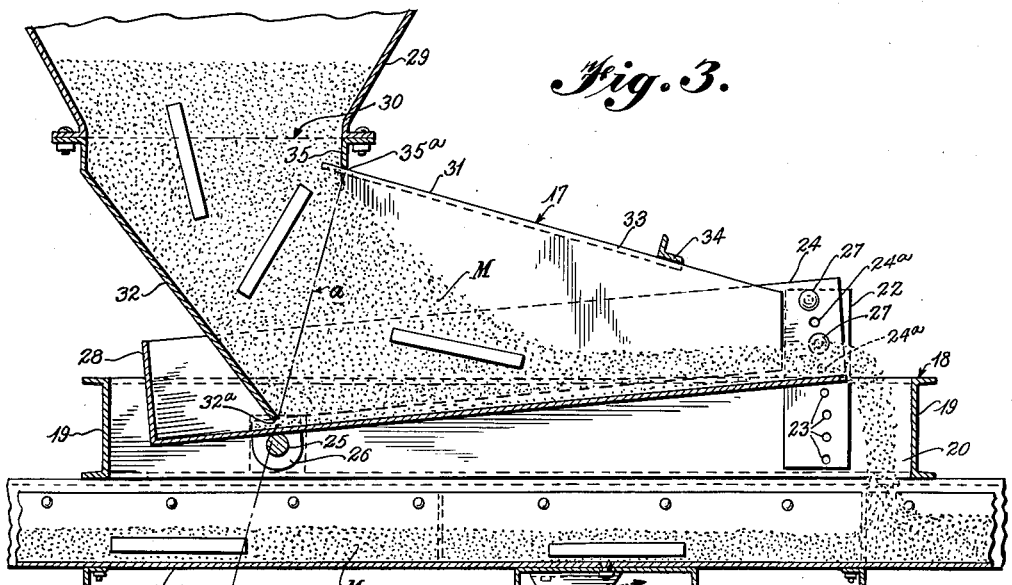
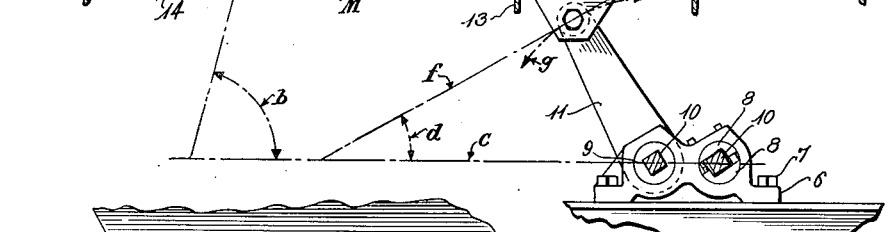
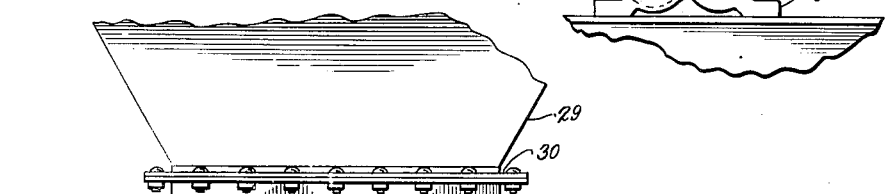
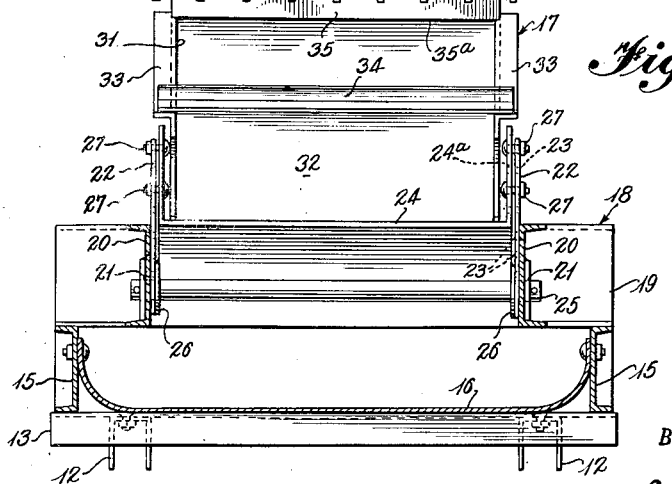
INVENTORS
Albert Musschoot and
BY Henry W. Regensburger
ATTORNEY Patented Mar. 4, 1952

2,588,030

UNITED STATES PATENT OFFICE 2,588,030

FEEDER FOR OSCILLATING CONVEYERS

Albert Musschoot, Park Ridge, and Henry W. Regensburger, Chicago, Ill., assignors to Link-Belt Company, a corporation of Illinois Application December 8, 1948, Serial No. 64,152

4 Claims. (Cl. 198—53)

This invention relates to new and useful improvements in hopper type gravity feeders for oscillating conveyors and deals more particularly with inbuilt gravity feeders adapted for uniform adjustable discharge onto the trough of an oscillating conveyor.

The feeding of material onto the deck or trough of an oscillating conveyor through a gravity feeding device presents a particular problem in that the discharge opening of the device must be large enough to prevent bridging of the material thereacross. On the other hand, discharge of the material onto the conveyor at too rapid a rate results in spillage and waste.

In certain applications, it is desirable to feed material from two or more points onto a single oscillating conveyor. When multiple feeders are employed, it becomes of even greater importance that the material be uniformly distributed across the trough so that successive feedings may fill the trough to a uniform depth.

In addition to the distribution of the conveyed material, it is important that the total depth of the material on the conveyor not exceed the trough depth. For this reason, the rate of flow of the material from the feeder must be carefully adjusted, and, when multiple feeders are employed, the rate of flow of each must be adjusted so that the total depth of the material bed at the discharge end of the conveyor does not exceed the trough depth.

It is the primary object of this invention to provide a feeder apparatus for supplying a uniformly distributed, variable amount of material to the trough of an oscillating conveyor.

A further object of the invention is to provide a feeder for oscillating conveyors having a discharge opening of sufficient size to prevent bridging of the opening by the material in the feeder and an adjustable control to prevent the material from flowing too rapidly from the feeder.

A further object of the invention is to provide a device for feeding material onto an oscillating conveyor at a uniformly distributed, adjustable depth at one or more points along the length of the conveyor.

A further important object of the invention is to provide a plurality of feeders for simultaneously supplying material to an oscillating conveyor at different points along the length of the conveyor in such a manner that the depth of the material is uniform across the width of the trough and is increased by adjustable increments at successive feeding points.

Still another object of the invention is to provide an oscillating conveyor having one or more inbuilt feeder chutes for supplying the conveyor with material from a corresponding number of free flowing hoppers in such a manner that the material is uniformly distributed transversely of the conveyor at any desired predetermined depth.

Further objects and advantages of the invention will be apparent during the course of the following description.

In the accompanying drawings forming a part of this specification and in which like numerals are employed to designate like parts throughout the same, Figure 1 is a side elevational view of an oscillating conveyor and a plurality of feeders embodying the invention, Figure 2 is a detail plan view of a feeder embodied in the apparatus of Fig. 1, Figure 3 is a vertical sectional view taken on line 3—3 of Fig. 2, and Figure 4 is a vertical sectional view taken on line 4—4 of Fig. 2.

In the drawings, wherein for the purpose of illustration is shown a preferred embodiment of this invention, and first particularly referring to Figs. 1 and 3, reference character 5 designates the conveyor base which is provided with two parallel rows of housings 6 suitably connected to the base 5 by the bolts 7. The housings in the two rows are arranged in transversely aligned pairs. Each of the housings 6 is formed with two parallel, transverse openings and is provided with a pair of clamping shoes 8 positioned in one opening and a bushing 9 positioned in the other opening. Each pair of clamping shoes 8 is arranged in transverse, axial alignment with a bushing 9 in the oppositely arranged housing 6.

A torsion bar 10 is clamped at one of its end portions between each pair of clamping shoes 8 and extends transversely of the base 5 through the axially aligned bushing 9 to have a supporting arm 11 suitably fastened to its projecting end portion. The supporting arms 11 all extend upwardly at the same desired angle with the horizontal. The upper end portions of the supporting arms 11 are provided with brackets 12 which are pivotally connected thereto. The brackets 12 of each pair of opposite supporting arms 11 are suitably connected to an attachment plate 13 which is located transversely above the base 5.

A trough 14 rests upon and is connected to all of the attachment plates 13 of the supporting arms 11. The trough consists of a pair of parallel channel beams 15 arranged in back-to-back relation with a pan 16 positioned between and suitably connected to said beams.

A suitable drive for imparting oscillatory motion to the trough 14 is provided by the prime mover A which is mounted on the base 5 and operatively connected by the belt B, or the like, to an eccentrically formed shaft C, rotatably mounted on the base 5. The eccentrically formed shaft C is connected to the bottom of the trough 14 by the driving arm D so that rotation of the shaft causes the driving arm to oscillate the trough.

A plurality of feeders 17 are located at spaced intervals along the length of the conveyor trough 14 and are employed for feeding the desired material, either simultaneously, as a pair or separately, to the trough. Inasmuch as the feeders 17 are substantially duplicates of each other, a description of one will suffice for all.

Referring now to Figs. 2, 3 and 4, for a detailed description of a feeder 17, the rectangular supporting frame 18 rests upon and is suitably connected to the tops of the trough channel beams 15 to extend longitudinally of the conveyor trough 14. This supporting frame consists of a pair of parallel, end channel beams 19 extending across the conveyor trough 14, in spaced back-to-back relation, and a pair of parallel, side channel beams 20 extending between and suitably connected at their ends to the backs of the end channel beams 19. The side channel beams 20 are spaced at equal distances from the longitudinal center line of the conveyor trough 14 in proximity to the inner faces of the channel beams 15 forming the side walls of the trough.

The side channel beams 20 are provided with axially aligned, reinforced openings 21 in their rear end portions. The front end portions of the side channel beams 20 are each provided with a vertical plate 22. These plates have transversely aligned openings 23 that are spaced along arcuate paths having the openings 21 as their centers.

A feed chute 24, having a discharge opening at its outer end, is pivotally connected to the supporting frame 18 by the rod 25 which passes through the openings 21 and through the lugs 26 which are connected to and depend from the bottom of the feed chute near its rear end portion. The discharge end portion of the feed chute 24 is adjustably connected to the vertical plates 22 by the bolts 27 which pass through the plate openings 23 and through the openings 24a formed in the side walls of the chute 24. The rear end of the chute 24 is closed by the wall 28.

A stationary hopper 29, having a flanged discharge opening 30, is suitably supported above the rear end portion of the chute 24. A discharge spout 31 is bolted to the flange of the discharge opening 30 and has a rear wall 32 sloping forwardly and downwardly into proximity with the bottom of the feed chute 24. The side walls of the discharge spout 31 rise vertically adjacent the sides of the chute 24, to increase the effective height of the latter, and extend longitudinally of said side walls to a point near the discharge end of the chute. These side walls of the spout are strengthened by the edge flanges 33 and the transverse angle iron 34 which is connected to the flanges.

It is noted at this point that the actual discharge opening of the spout 31 is bounded at its bottom by the lower edge 32a of the rear wall 32 and at its top by the lower edge 35a of the front wall 35 of the spout. This discharge opening of the spout, therefore, lies in a plane that is represented by the line $a$ in Fig. 3. The included angle $b$ is formed between the aforesaid line $a$ and line $c$ which represents an arbitrary reference plane illustrated as passing through the axes of the torsion bars 10. It is to be understood that the arbitrary reference plane, represented by the line $c$, may be any substantially horizontal plane and is not to be construed as being limited to a plane passing through the axes of the torsion bars 10. It is important that the angle $b$ be at least equal to, but preferably greater than, the included angle $d$. This last mentioned angle is formed between line $c$ and line $f$ that is tangent to the mid-point of the arcuate path $g$ which represents the path of oscillation of the trough 14.

The above discussed arrangement of the angles $b$ and $d$ prevents the vertical component of the oscillatory movement of the trough 14 from packing the material M into the discharge opening of the spout 31. Further, the rear wall 32 supports the major portion of the material M in the discharge spout 31.

The operation of the feeder 17 illustrated in Figs. 2, 3 and 4, will now be described. Material M to be conveyed in the conveyor trough 14 is delivered in any desired manner to the hopper 29. Although the gravity feeders embodying this invention are not limited to such use, they have proved to be particularly suited for handling mold sand, and such foreign objects as cope reinforcing bars, from shakeout stations in foundries. The discharge opening of the spout 31 is made sufficiently large to prevent bridging of the material thereacross or jamming of the opening by foreign objects. The material M, therefore, will flow rapidly through the discharge opening of the spout 31 into the chute 24 where it will accumulate causing the material to completely fill the discharge spout. The substantially horizontal direction of discharge of the material M from the discharge spout 31 prevents the material from being fed from the hopper at a greater rate than the material is discharged from the open end of the chute 24 into the conveyor trough 14.

It has been stated above that the inclination of the chute 24 may be adjusted to regulate the rate of flow of material by raising or lowering its discharge end. Each time the chute 24 moves upwardly with the conveyor trough 14, the material M in the chute is, in effect, sheared from and is carried a short distance or space away from the material in the spout. This permits material M from the portion of the spout inwardly of its discharge opening to flow by gravity into the space which is vacated by movement of the material.

The angle of repose of the particular material being discharged from the hopper 29 through its spout 31; the extent to which angle $b$ exceeds angle $d$, see Fig. 3; and the angle of inclination of the chute 24 all function collectively to determine the rate of discharge of the material from the outer end of the chute as a result of oscillation of the chute with the conveyor trough 14. It will be apparent, therefore, that the feeder 17 will function automatically to constantly feed material to the oscillating conveyor trough 14 at the rate that is provided by the selected adjustment of the inclination of chute 24.

The chute 24 is of sufficient length to function, due to its oscillating motion, as a feeder that will deliver the material from its discharge end as a stream of uniform depth throughout its entire width. Because the chute 24 is oscillated at the same frequency and through the same path as the conveyor trough 14, the advancement of the material along both the chute and the trough will be maintained at constant relative rates so long as the inclination of the chute is not changed. The material discharged from the chute, therefore, will be received by the conveyor trough 14 as a layer or stratum which has a uniform depth throughout the width of the trough.

If the feeder being considered is the first one delivering to the conveyor trough, its layer or stratum of material will be applied directly to the bottom of the trough. If the feeder is second or third in line along the length of the conveyor trough, its uniform layer or stratum of material will be applied to the top of the previously applied layer or layers, as is more clearly illustrated in Fig. 3. It will be apparent, therefore, that the conveyor trough 14 can be operated at any desired percentage of its maximum capacity with either one, two or more feeders 17 in operation by merely properly adjusting the inclinations of the chutes 24 of the active feeders. It, also, is apparent that by properly adjusting the chutes 24 of all of the active feeders so that their total rate of delivery of material does not exceed the maximum capacity of the conveyor, the trough 14 will not be overloaded and no material will be spilled over the sides of the trough.

From the above, it will be appreciated that the gravity feeder embodying this invention is suitable for use, either singly or in combinations of two or more, for delivering any suitable material formed of flowable solids, either with or without foreign objects of reasonable sizes scattered therethrough, to a single oscillating conveyor. When two or more gravity feeders 17 are associated with an oscillating conveyor, the resultant assembly will function to deliver to a single locaiton the material that is received from the several feeders.

Also, the oscillating conveyor may be caused to deliver to its point of discharge either equal or different amounts of material from the several stations served by the different feeders by properly adjusting the delivery rates of the feeders relative to each other. It will be obvious, therefore, that the assembly of Fig. 1 can be employed for delivering to a single location relatively accurately measured quantities of two or three dissimilar materials that are to be mixed, or used in combination, by supplying said materials to the different feeders.

It is to be understood that the form of the invention herewith shown and described is to be taken as a preferred example of the same, and that various changes in the shape, size and arrangement of parts may be resorted to without departing from the spirit of the invention or the scope of the subjoined claims.

Having thus described the invention, we claim:

1. A device of the type described, comprising of the combination with a conveyor trough mounted for oscillatory movement through an acurate path, of a stationary hopper having a large opening, arranged at a greater acute angle with respect to said trough than the line of tangency through the midpoint of its arcuate path through which material from the hopper may discharge at a rapid rate, a flat bottomed chute having an open discharge end above and extending transversely across said conveyor trough, for receiving material from and accumulating it across the hopper opening to retard the rate of discharge through the opening, said chute being mounted on said trough for oscillatory movement therewith to effect discharge of the material from the discharge end of the chute into the trough at a rate below that at which the material can discharge through the hopper opening, and means for varying the rate of discharge of material from the open end of the chute into the trough.

2. A device of the type described, comprising the combination with a conveyor trough mounted for oscillatory movement through an arcuate path, of a plurality of stationary hoppers spaced along the conveyor trough each having a large opening, arranged at a greater acute angle with respect to said trough than the line of tangency through the midpoint of its arcute path, through which material from the hopper may discharge at a rapid rate, a separate chute having an open discharge end portion above and extended transversely of said trough, for receiving material from and accumulating it across each hopper opening to retard the rate of discharge through the openings, said chute being mounted on said trough for oscillatory movement therewith to effect discharge of the material from each of the chutes into the trough at a rate below that at which the material can discharge through the hopper opening and directly proportional to the speed of oscillation of said trough, and means for individually varying the proportional rate of discharge of material from each of the chutes into the trough.

3. A device of the type described, comprising the combination with a conveyor trough mounted for oscillating movement through an arcuate path, of a stationary hopper having a large discharge opening, angularly arranged with respect to a substantially horizontal reference plane, through which material from the hopper can discharge at a rapid rate, a chute having an open end portion above and extended transversely of said trough, for receiving material from and accumulating it across the hopper opening to retard the rate of discharge through the opening, means mounting said chute in an inclined position above said trough with its open end portion higher than its other end portion for oscillatory movement with the trough, the line of tangency through the mid-point of said arcuate path being at a lesser angle with respect to said reference plane than said discharge opening, means for adjusting said mounting means for changing the inclination of said chute, and means for oscillating said trough to effect discharge of the material from the open end portion of said chute at a rate dependent upon the inclination of the chute and the speed of oscillation of said trough and below that at which the material can discharge through the hopper opening.

4. A device of the type described, comprising the combination with a conveyor trough mounted for oscillatory movement through an arcuate path, the line of tangency through the mid-point of said path being at an acute angle with respect to a substantially horizontal reference plane and extending in the general direction of movement of materials in said trough, of a stationary hopper having a large horizontal opening through which material from the hopper may discharge by gravity at a rapid rate, a flat bottomed inclined chute having its higher end portion open for the discharge of material, a deflecting spout having a rear wall extending from the back marginal edge of said hopper opening to a point closely adjacent to said chute bottom, the plane defined by the bottom edge of said rear wall and the front marginal edge of said hopper opening being at a greater angle with respect to said reference plane than the aforesaid line of tangency, said spout also having side walls cooperating with said rear wall to form an open bottom passageway extending from said hopper opening lengthwise of and closely adjacent to said chute, said chute acting to accumulate material in said spout to retard the rate of discharge through the open bottom of the spout passageway, a frame rigidly connected to and extending lengthwise of said conveyor trough for movement with the latter, and separate means for pivotally connecting the lower end portion of said chute to the frame and for connecting the open higher end portion of said chute to the frame in different pivotally adjusted inclined positions to cause the chute to move bodily with the frame and the trough for effecting discharge of the material from the open higher end portion of the chute into the trough at a rate below that at which the material can discharge through the open bottom of the spout and to vary the rate of discharge of material from said chute depending on the inclined position of the chute.

ALBERT MUSSCHOOT.
HENRY W. REGENSBURGER.

REFERENCES CITED

The following references are of record in the file of this patent:

UNITED STATES PATENTS

| Number | Name | Date |
|---|---|---|
| 144,465 | Lytch | Nov. 11, 1873 |
| 379,704 | Krause | Mar. 20, 1888 |
| 2,031,369 | Holbeck | Feb. 18, 1936 |
| 2,100,878 | Shallock | Nov. 30, 1937 |
| 2,389,566 | Thomas | Nov. 20, 1945 |

FOREIGN PATENTS

| Number | Country | Date |
|---|---|---|
| 96,210 | Austria | Mar. 10, 1924 |